(12) United States Patent
Nakatsugawa (10) Patent No.: US 6,205,123 B1
(45) Date of Patent: Mar. 20, 2001

(54) STATE INFORMATION MANAGING METHOD AND SYSTEM EMBODYING THE SAME

(75) Inventor: Yoshinori Nakatsugawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/071,914

(22) Filed: May 5, 1998

(30) Foreign Application Priority Data

May 6, 1997 (JP) ...................................... 9-115734

(51) Int. Cl.⁷ .............................. H04L 12/26; H04J 1/00; G05B 23/02
(52) U.S. Cl. ...................... 370/257; 370/489; 340/825.07
(58) Field of Search ..................................... 370/254, 257, 370/389, 392, 465, 489; 704/208, 209, 220, 221, 223; 340/825.06, 825.07

(56) References Cited

U.S. PATENT DOCUMENTS

| | | | |
|---|---|---|---|
| 5,109,486 | * | 4/1992 | Seymour .............................. 395/200 |
| 5,499,018 | | 3/1996 | Welmer . |
| 5,517,622 | * | 5/1996 | Ivanoff et al. ................... 395/200.13 |
| 5,537,104 | * | 7/1996 | Van Dort et al. ................ 340/825.52 |
| 5,761,429 | * | 6/1998 | Thompson ....................... 395/200.54 |
| 6,085,244 | * | 7/2000 | Wookey ................................. 709/224 |
| 6,115,387 | * | 9/2000 | Egbert et al. ......................... 370/423 |
| 6,124,806 | * | 9/2000 | Cunningham et al. ......... 340/870.02 |

FOREIGN PATENT DOCUMENTS

| | | |
|---|---|---|
| 5-145554 | 6/1993 | (JP) . |
| 6-68000 | 3/1994 | (JP) . |

* cited by examiner

*Primary Examiner*—Hassan Kizou
*Assistant Examiner*—Duc Ho
(74) *Attorney, Agent, or Firm*—Oblon, Spivak, McClelland, Maier & Neustadt, P.C.

(57) ABSTRACT

In a system wherein a plurality of communication units are connected to a bus to exchange mutual communication and a collecting communication unit collects state information indicating respective states from report communication units to manage their state information, the collecting communication unit includes an address setting portion for setting information indicating that own unit is a unit for collecting state information as identification information, and each of the report communication units includes a report command setting portion for setting identification information as a destination address and also a report command including a destination address and the state information and a transmitting portion for transmitting the report command to the collecting communication unit based on the destination address in the set report command.

12 Claims, 4 Drawing Sheets

STATE INFORMATION MANAGING METHOD AND SYSTEM EMBODYING THE SAME

BACKGROUND OF THE INVENTION

1. Field of the Invention

The present invention relates to a state information managing method which is able to manage easily state information of respective communication units and also reduce a communication traffic volume required for management of state information in a communication system wherein a plurality of communication units for exchanging data communication mutually are connected to a bus, and a system embodying the same.

2. Description of the Prior Art

In a communication system in which a plurality of communication units are connected to a bus, respective communication units can exchange data communication mutually. At this time, since internal states of respective communication units are changed with the lapse of time, state information indicating the internal states have been managed by the communication units respectively.

As the state information management method, there has been such a method that, when the data management portion issues a state request to respective communication units, such respective communication units transmits a state response to the data management portion in response to the state request from the data management portion. However, according to this method, since the state request and the state response must be issued from respective communication units, an extensive communication traffic volume has been needed.

Therefore, there has been known the first method to reduce the communication traffic volume of the state request. In the first method, once the state request has been issued after a state information collecting destination has been identified clearly, the communication units which receive such state request have transmitted automatically state reports to the state information collecting destination subsequently every time when their states are changed. According to the first method, the communication traffic volume of the state request can be reduced.

However, according to the above first method, since information as for the state information collecting destination must be transmitted to respective communication units, communication for informing respective communication units of such information as for the state information collecting destination have not been able to be omitted.

In addition, as the second method to reduce the communication traffic volume of the state request, there has been a method set forth in Patent Application Publication (KOKAI) Hei 6-68000, for example. According to this method set forth in Patent Application Publication (KOKAI) Hei 6-68000, temporary addresses which are different from individual addresses are temporarily set, then such temporary addresses are distributed to any objective terminal devices on a transmission line, and then only the objective terminal devices can be controlled every temporary address by virtue of communication frames.

However, in the second method, the temporary addresses has had to be transmitted to respective terminal devices which need the state information. Therefore, according to the second method, it has been difficult to reduce the communication traffic volume smaller than that in the first method.

SUMMARY OF THE INVENTION

The present invention has been made in light of the above circumstances, and it is an object of the present invention to provide a state information managing method which is able to manage easily state information of respective communication units and also reduce a communication traffic volume required for management of the state information, and a system embodying the same.

In order to achieve the above object, according to the present invention, there is provided a state information managing method wherein a collecting communication unit is able to collect state information indicating respective states from one or more report communication units except the collecting communication unit to manage their state information in a communication system in which a plurality of communication units are connected to a bus to exchange mutual communication, the method comprising: an identification information setting step of setting information indicating that own unit is a unit for collecting the state information as identification information in the collecting communication unit and also setting information indicating that own unit is not the unit for collecting the state information as the identification information in respective report communication units; a report command setting step of setting a report command including a destination address having the identification information and the state information in respective report communication units; and a transmitting step of transmitting the report command from respective report communication units to the collecting communication unit based on the destination address in the report command which is set in the report command setting step.

According to the present invention, information indicating that own unit is the unit for collecting the state information are set as identification information in the collecting communication unit, and the report command including the destination address having the identification information and the state information are set in respective report communication units, and the report commands are transmitted from respective report communication units to the collecting communication unit based on the destination address in the report command which is set in the report command setting step.

In other words, respective report communication units can exchange communication of the state information only by informing the collecting communication unit identified by the identification information of the state information, so that the flow for informing respective report communication units of the collecting destinations can be omitted. As a result, the communication traffic volume can be reduced still more.

In the preferred embodiment of the present invention, the state information managing method further comprises the receiving step of receiving the state information including the report command in the collecting communication unit when identification information included in the report command from respective report communication units coincides with identification information which has been set to the collecting communication unit by the identification information setting step.

In the preferred embodiment of the present invention, the identification information is a state receiving address, and according to the identification information setting step, the collecting communication unit can set a particular state receiving address as the identification information and also each of respective report communication units can set a state receiving address identical to own address as the identification information.

In the preferred embodiment of the present invention, the identification information is an identifier, and according to the identification information setting step, the collecting communication unit can set an identifier of "1" or "0" as the identification information and also each of respective report communication units can set the identifier of "0" or "1" as the identification information.

In order to achieve the above object, according to the present invention, there is provided a state information managing system wherein a collecting communication unit is able to collect state information indicating respective states from one or more report communication units except the collecting communication unit to manage their state information in a communication system in which a plurality of communication units are connected to a bus to exchange mutual communication, the collecting communication unit comprising: a first identification information setting portion for setting information indicating that own unit is a unit for collecting state information as identification information; and each of the report communication units comprising: a second identification information setting portion for setting information indicating that the own unit is not a unit for collecting the state information as the identification information; a report command setting portion for setting a report command including a destination address having the identification information and the state information; and a transmitting portion for transmitting the report command to the collecting communication unit based on the destination address in the report command set by the report command setting portion.

According to the present invention, the first identification information setting portion of the collecting communication unit sets information indicating that its own unit is the unit for collecting state information as the identification information. In respective report communication units, the report command setting portion sets the report command including the destination address having the identification information and the state information, and the transmitting portion transmits the report command to the collecting communication unit based on the destination address in the report command set by the report command setting portion.

In other words, respective report communication units can exchange communication of the state information only by informing the collecting communication unit identified by the identification information of the state information, so that the flow for informing respective report communication units of the collecting destinations can be omitted. As a result, the communication traffic volume can be reduced still more.

In the preferred embodiment of the present invention, the collecting communication unit further comprises a receiving portion for receiving state information including the report command when identification information included in the report command transmitted from the transmitting portion of each of the respective report communication units coincides with identification information which has been set by the first identification information setting portion.

In the preferred embodiment of the present invention, the identification information is a state receiving address, and the first identification information setting portion can set a particular state receiving address as the identification information and also the second identification information setting portion can set a state receiving address identical to own address as the identification information.

In the preferred embodiment of the present invention, the identification information is an identifier, and the first identification information setting portion can set an identifier of "1" or "0" as the identification information and also the second identification information setting portion can set the identifier of "0" or "1" as the identification information.

The nature, principle and utility of the invention will become more apparent from the following detailed description when read in conjunction with the accompanying drawings.

DESCRIPTION OF THE PREFERRED EMBODIMENTS

State information managing methods and systems embodying the same according to embodiments of the present invention will be explained in detail with reference to the accompanying drawings hereinafter.

<First Embodiment>

Figure 1:
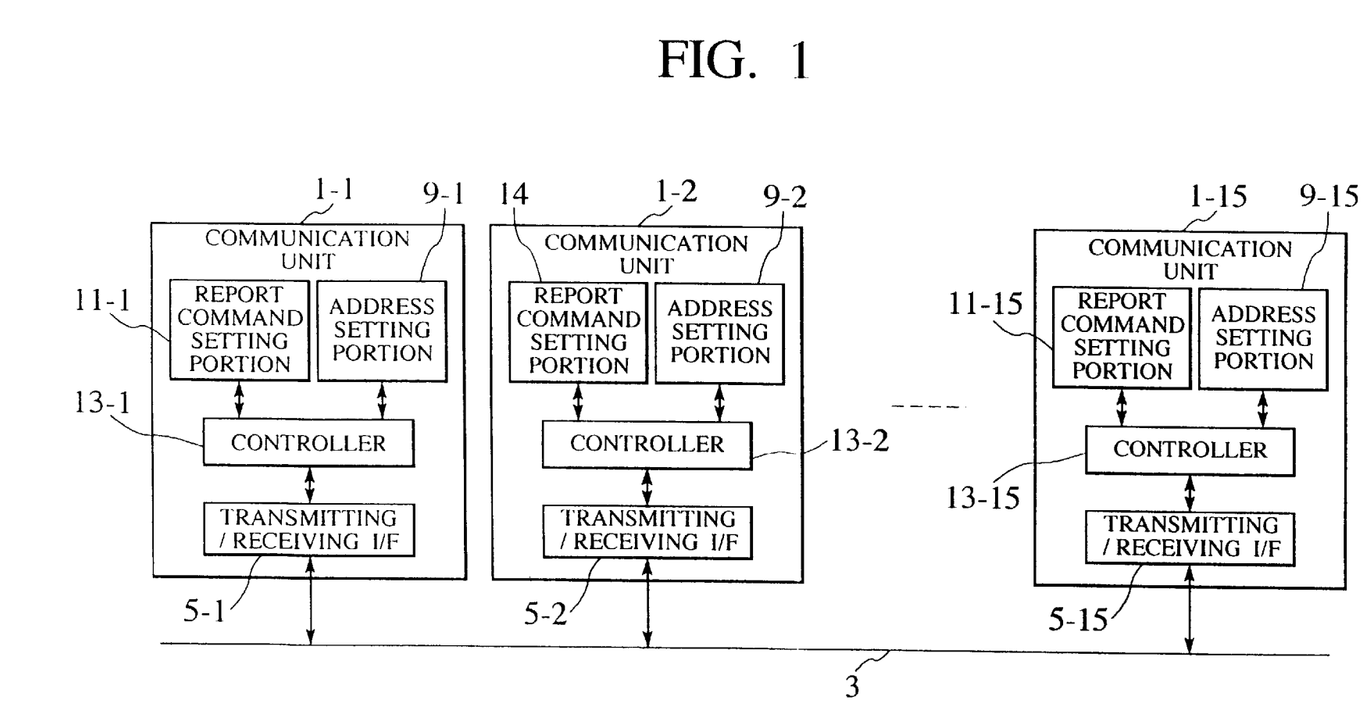
FIG. 1 is a view showing a configuration of a state information managing system according to a first embodiment of the present invention.

At first, a state information managing method and a system embodying the same according to a first embodiment of the present invention will be explained hereunder. FIG. 1 is a view showing a configuration of a state information managing system according to the first embodiment of the present invention.

The state information managing system is constructed such that a plurality of communication units 1-1 to 1-15 are connected to a bus 3 so as to exchange data communication mutually.

The communication unit 1-1 is one of reporting communication units which report their state information to the communication unit 1-2. The communication unit 1-2 can operate as a collecting communication unit which collects state information indicating states of respective communication units.

The communication unit 1-1 comprises a transmitting/receiving interface (referred to as "transmitting/receiving I/F" hereinafter) 5-1 for transmitting/receiving state information and various information to/from other communication units, an address setting portion 9-1 for setting own address and a state receiving address used to receive the state information in an address area of data to be received, a report command setting portion 11-1 for setting a report command for the communication unit 1-2, and a controller 13-1 for controlling the above respective portions.

Each of the communication units 1-3 to 1-15 also comprises the transmitting/receiving I/F, the address setting portion, the report command setting portion, and the controller. The communication units 1-3 to 1-15 are also constructed to have the same configuration as the communication unit 1-1, and operate as reporting communication units for reporting the state information to the communication unit 1-2.

The communication unit 1-2 can operate as a collecting communication unit which collects state information, and comprises the transmitting/receiving I/F 5-2 for transmitting/receiving state information and various information to/from other communication units, the address setting portion 9-2 for setting own address and a state receiving address used to receive the state information in the address area of data to be received, a state information memory 14 for storing the state information of all the communication units 1-1 to 1-15, and the controller 13-2 for controlling the above respective portions.

Figure 2:
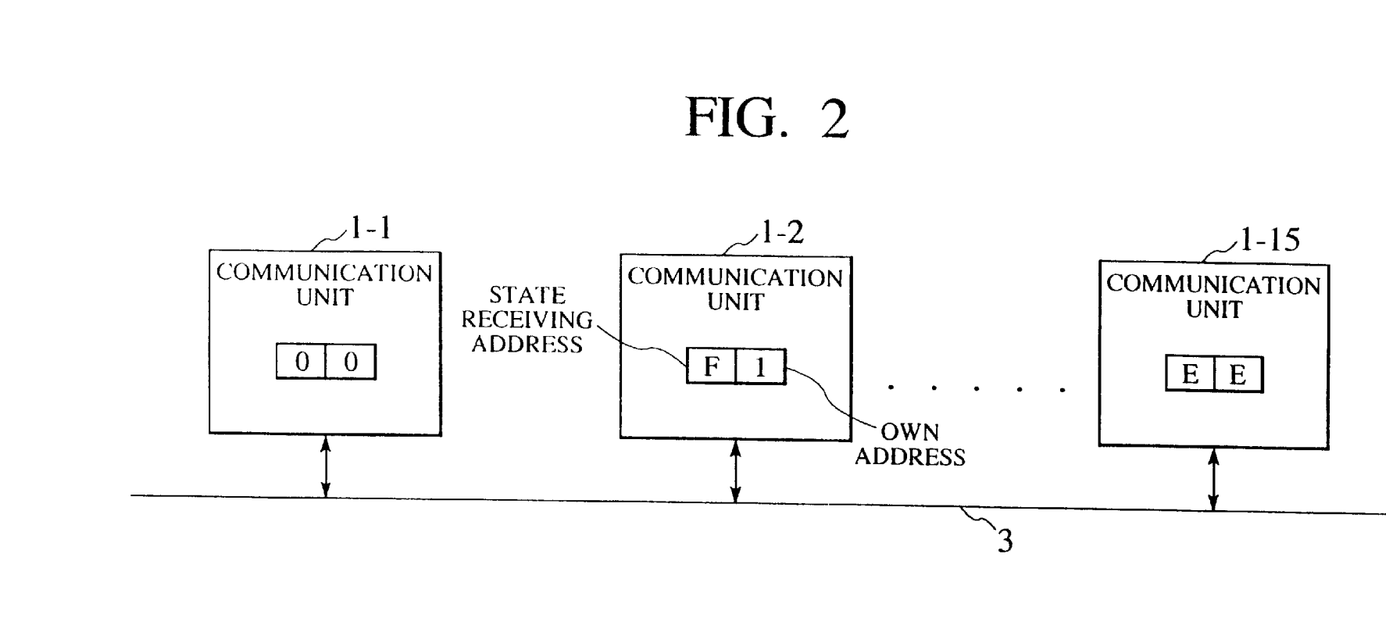
FIG. 2 is a block diagram showing an example of setting of own address and a state receiving address in respective communication units in the first embodiment of the present invention.

FIG. 2 shows an example of setting of own address and the state receiving address in respective communication units in the first embodiment of the present invention. As shown in FIG. 2, in the communication unit 1-2, an address "1" as its own address and an address "F" as the state receiving address are set in its address area by the address setting portion 9-2. In other words, a value of the state receiving address is set differently from a value of its own address.

The state receiving address "F" is identification information indicating that its own communication unit 1-2 is a unit to collect the state information of the communication units 1-1, 1-3 to 1-15. Hence, the address setting portion 9-2 constitutes the identification information setting portion.

The transmitting/receiving I/F 5-2 of the communication unit 1-2 receives data having the destination "F" in addition to data having the destination "1" based on its own address "1" and the state receiving address "F" set by the address setting portion 9-2.

Furthermore, in the communication units 1-1, 1-3 to 1-15, addresses "0, 2 to E" are set as their own addresses in their address areas by the address setting portions 9-1, 9-3 to 9-15 and also addresses "0, 2 to E" identical to their own addresses are set as the state receiving addresses in their address areas by the address setting portions 9-1, 9-3 to 9-15. The transmitting/receiving I/Fs 5-1, 5-3 to 5-15 of the communication units 1-1, 1-3 to 1-15 receive only data whose destinations have their own addresses "0, 2 to E".

For instance, as shown in FIG. 2, the address setting portion 9-1 sets both its own address and the state receiving address to "0" while the address setting portion 9-15 sets both its own address and the state receiving address to "E". The communication units 1-1 to 1-15 receives data having the addresses which have been set in respective address areas as their own addresses and the state receiving addresses.

Figure 3:
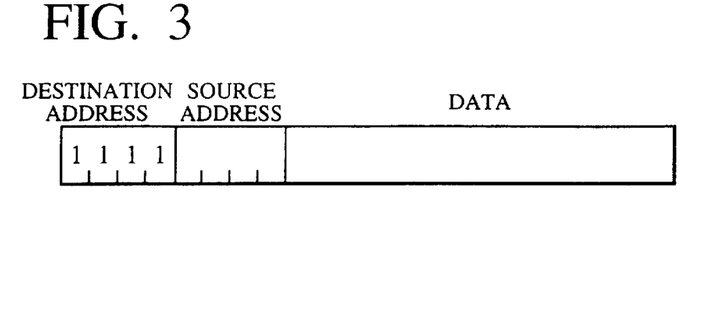
FIG. 3 is a view showing a format of a report command for use in the state information managing system according to the first embodiment of the present invention.

FIG. 3 is a view showing a format of the report command for use in the state information managing system according to the first embodiment of the present invention. As shown in FIG. 3, the report command is made up of the destination address, the source address, and the data including the state information. For example, the report command shown in FIG. 3 is a command in which "F" (identical to the state receiving address "F" which has been set as four bits "1111" by the address setting portions 9-2) is set in the destination address.

Figure 4:
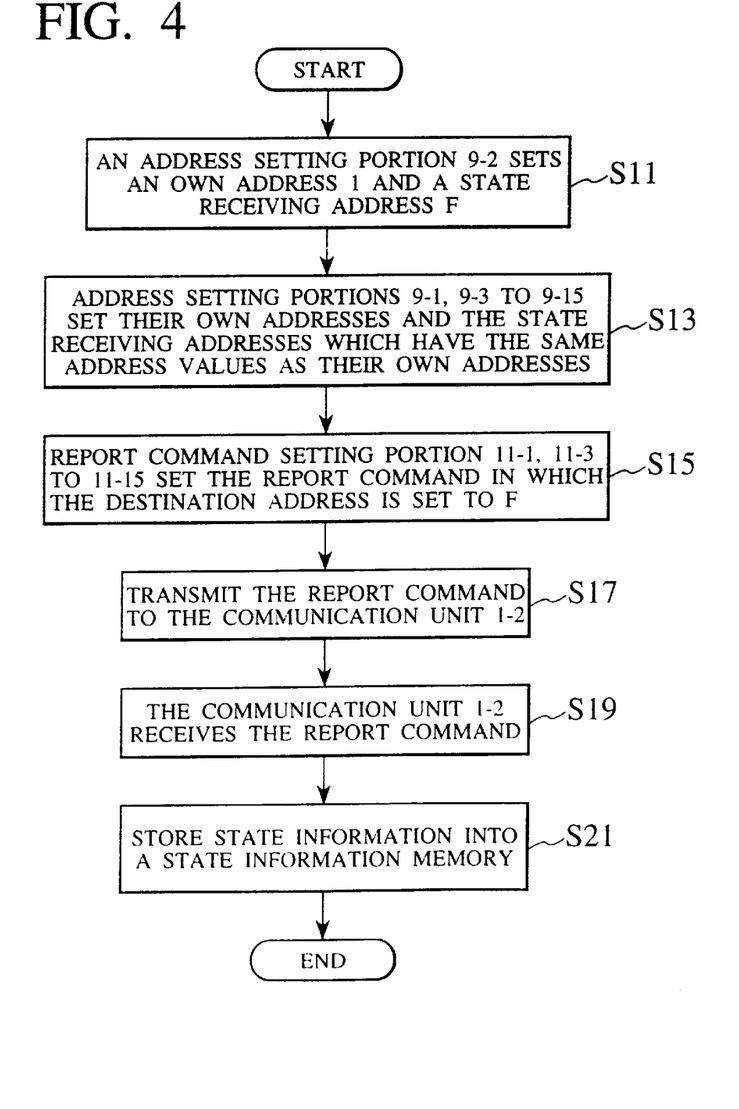
FIG. 4 is a flowchart showing a state information managing method which can be achieved by the state information managing system according to the first embodiment of the present invention.

Next, a state managing method which can be carried out by the state information managing system as constructed as above will be explained with reference to a flowchart in FIG. 4 hereunder. First, in the communication unit 1-2, the address setting portions 9-2 sets "1" as its own address by and "F" a predetermined state receiving address (step S11).

Then, in the communication units 1-1, 1-3 to 1-15, the address setting portions 9-1, 9-3 to 9-15 set their own addresses and the state receiving addresses which have the same address values as their own addresses (step S13).

For example, the address setting portion 9-1 of the communication unit 1-1 sets "0" as its own address and "0" as the state receiving address whereas the address setting portion 9-15 of the communication unit 1-15 sets "E" as its own address and "E" as the state receiving address.

Next, in the communication units 1-1, 1-3 to 1-15, the report command setting portion 11-1, 11-3 to 11-15 set the report command in which the destination address is set to F (identical to the state receiving address "F" which has been set by the address setting portions 9-2) (step S15). As shown in FIG. 3, the destination F in the report command can be represented by four bit information of "1111".

Then, the transmitting/receiving I/Fs 5-1, 5-3 to 5-15 transmit the report command set by the report command setting portion 11-1, 11-3 to 11-15 to the communication unit 1-2 via the controllers 13-1, 13-3 to 13-15 (step S17). In other words, by transmitting the report command having the destination F from respective communication units, the state information can be transmitted concentratedly to the communication unit 1-2, in which the state receiving address is set to F.

Meanwhile, in the communication unit 1-2, the controller 13-2 then checks whether or not the state receiving address F set by the address setting portion 9-2 coincides with the destination address in the report command. Since the state receiving address F coincides with the destination address F in the report command, the transmitting/ receiving I/F 5-2 receives, the report commands from respective communication units 1-1, 1-3 to 1-15 (step S19).

Then, the state information in respective received report commands are stored into the state information memory 14 (step S21).

In this manner, in the state information managing system, predetermined addresses indicating the state information collecting destinations other than own address are set as the state receiving address previously in the communication units for collecting the state information among the plurality of communication units.

For this reason, only transmission of the report commands including the state information to predetermined addresses makes it possible for the communication units for reporting the state information to communicate the state information. Therefore, a flow for informing respective communication units of the collection destination can be omitted. As a result, the communication traffic volume can be reduced.

Although one type of F as the state receiving address has been explained in the first embodiment, the state receiving address can be identified relative to type of the state information, function of the communication units, relative location of the communication units, etc. if plural types of state receiving addresses are present.

In addition, although only one communication unit in which the state receiving address being different from its own address is set has been employed in the first embodiment, a plurality of communication units in which the state receiving address being different from its own address is set respectively may be employed. In this case, the state information can be transmitted to the plurality of communication units simultaneously.

<Second Embodiment>

Figure 5:
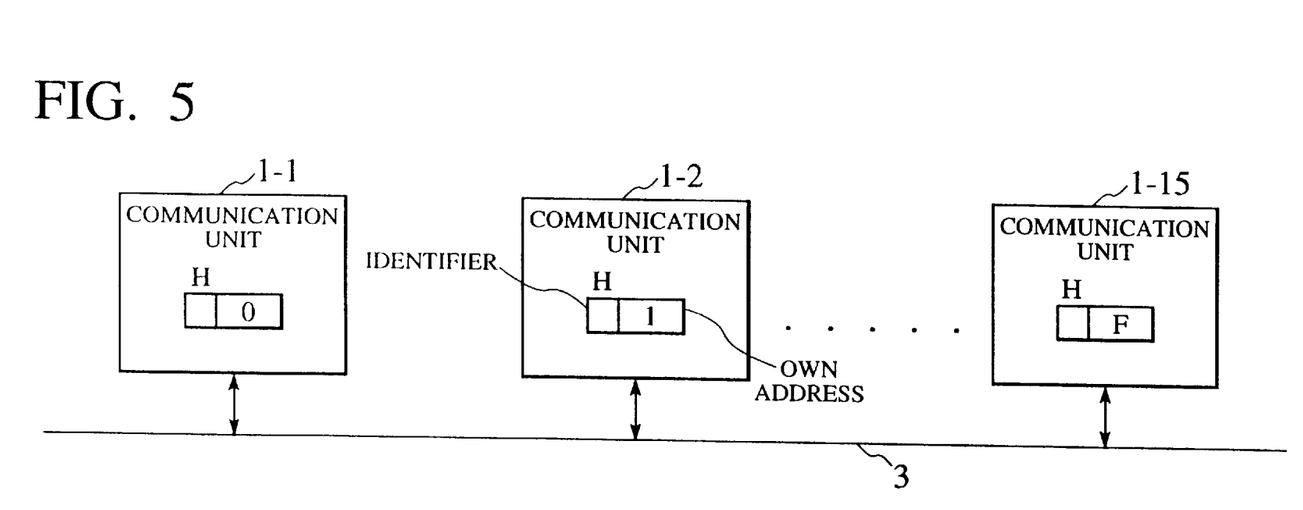
FIG. 5 is a block diagram showing an example of setting of own address and an identifier in respective communication units in a second embodiment of the present invention.

Next, a state information managing method and a system embodying the same according to a second embodiment of the present invention will be explained hereunder. FIG. 5 is a block diagram showing an example of setting of own address and an identifier in respective communication units in the second embodiment of the present invention. Since the state information managing system according to the second embodiment has the substantially same configuration as those of the first embodiment shown in FIG. 1, their detailed explanation of the identical portions will be omitted by assigning the same references thereto.

As shown in FIG. 5, the address setting portions 9-1 to 9-15 set their own addresses "0 to F" and an identifier H in the address area. The transmitting/receiving I/Fs 5-1 to 5-15 receive data which have the destination identified by their own addresses "0 to F" and values set by the identifiers H. The address setting portion 9-2 sets "1" as the identifier H.

Figure 6:
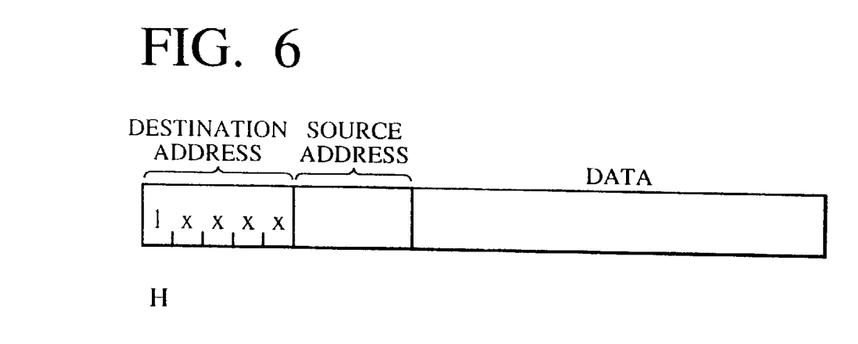
FIG. 6 is a view showing a format of a report command for use in the state information managing system according to the second embodiment of the present invention.

FIG. 6 shows a format of the report command for use in the state information managing system according to the second embodiment of the present invention. As shown in FIG. 6, the report command consists of the destination address, the source address, and data including the state information. For instance, the report command shown in FIG. 6 is a command in which "1" (which is identical to the identifier "1" set by the address setting portion 9-2) is set as the identifier H in the destination address.

According to the above configuration, the address setting portions 9-1 to 9-15 of the communication units 1-1 to 1-15 set their own addresses and the identifiers H. Where the address setting portion 9-2 sets the identifier H to "1" while the address setting portions 9-1, 9-3 to 9-15 set the identifiers H to "0" respectively. Further, for example, the address setting portion 9-1 sets its own address to "0" while the address setting portion 9-15 sets its own address to "F".

Next, as shown in FIG. 6, in the communication units 1-1, 1-3 to 1-15, the report command setting portions 11-1, 11-3 to 11-15 set the report commands in which the identifier H is set to "1" respectively.

Then, the transmitting/receiving I/Fs 5-1, 5-3 to 5-15 transmit the report command having the identifier H, which has been set by the report command setting portion 11-1, 11-3 to 11-15, to the communication unit 1-2 via the controllers 13-1, 13-3 to 13-15. In other words, the state information can be transmitted concentratedly to the communication unit 1-2 having the identifier H=1 by transmitting the report command from respective communication units.

In the meanwhile, in the communication unit 1-2, the controller 13-2 checks whether or not the identifier H=1 set by the address setting portion 9-2 coincides with the identifier H in the report commands. Since the identifier H=1 set by the address setting portion 9-2 coincides with the identifier H=1 in the report commands, the transmitting/receiving I/F 5-2 can receive the report commands issued from the communication unit 1-1, 1-3 to 1-15 respectively. Then, the state information in respective received report commands are stored in the state information memory 14.

Like this, since the report command having the identifier H=1 is transmitted from the communication unit to report the state information, the communication unit having the identifier H=1 can receive the report command, whereby communication of the state information is made possible.

Accordingly, even in the managing system according to the second embodiment, the flow for informing respective communication units of the collection destination can be omitted. As a consequence, the communication traffic volume can be reduced.

In the first embodiment, four-bit information have been needed in order to set the state receiving address "F". However, in the second embodiment, only one-bit information is needed in order to set the identifier H=1. Therefore, only a small memory capacity is requested.

According to the present invention, the identification information indicating that own unit is the unit for collecting the state information are set in the collecting communication unit. And, in respective report communication units, the identification information are set as the destination addresses and also the report commands including the destination addresses and the state information are set. Also, the report commands are transmitted to the collecting communication unit based on the destination address in the report command set by respective report communication units.

That is to say, respective report communication units can exchange communication of the state information only by informing the collecting communication unit as the destination indicated by the identification information of the state information, so that the flow for informing respective report communication units of the collecting destinations can be omitted. As a result, the communication traffic volume can be reduced still more.

In addition, the collecting communication unit can receive the state information included in the report command from respective report communication units when the destination address included in the report commands from respective report communication units coincides with the set identification information.

It should be understood that many modifications and adaptations of the invention will become apparent to those skilled in the art and it is intended to encompass such obvious modifications and changes in the scope of the claims appended hereto.

What is claimed is:

1. A state information managing method wherein a collecting communication unit is able to collect state information indicating respective states from one or more report communication units except the collecting communication unit to manage their state information in a communication system in which a plurality of communication units are connected to a bus to exchange mutual communication, the method comprising:

an identification information setting step of setting information indicating that own unit is a unit for collecting the state information as identification information in the collecting communication unit and also setting information indicating that own unit is not the unit for collecting the state information as the identification information in respective report communication units;

a report command setting step of setting a report command including a destination address having the identification information and the state information in respective report communication units; and a transmitting step of transmitting the report command from respective report communication units to the collecting communication unit based on the destination address in the report command which is set in the report command setting step.

2. A state information managing method of claim 1, further comprising the receiving step of receiving the state information including the report command in the collecting communication unit when identification information included in the report command from respective report communication units coincides with identification information which has been set to the collecting communication unit by the identification information setting step.

3. A state information managing method of claim 1, wherein the identification information is a state receiving address, and according to the identification information setting step, the collecting communication unit can set a particular state receiving address as the identification information and also each of respective report communication units can set a state receiving address identical to own address as the identification information.

4. A state information managing method of claim 2, wherein the identification information is a state receiving address, and according to the identification information setting step, the collecting communication unit can set a particular state receiving address as the identification information and also each of respective report communication units can set a state receiving address identical to own address as the identification information.

5. A state information managing method of claim 1, wherein the identification information is an identifier, and according to the identification information setting step, the collecting communication unit can set an identifier of "1" or "0" as the identification information and also each of respective report communication units can set the identifier of "0" or "1" as the identification information.

6. A state information managing method of claim 2, wherein the identification information is an identifier, and according to the identification information setting step, the collecting communication unit can set an identifier of "1" or "0" as the identification information and also each of respective report communication units can set the identifier of "0" or "1" as the identification information.

7. In a state information managing system wherein a collecting communication unit is able to collect state information indicating respective states from one or more report communication units except the collecting communication unit to manage their state information in a communication system in which a plurality of communication units are connected to a bus to exchange mutual communication, the collecting communication unit comprising:

a first identification information setting portion for setting information indicating that own unit is a unit for collecting state information as identification information; and each of the report communication units comprising:

a second identification information setting portion for setting information indicating that the own unit is not a unit for collecting the state information as the identification information;

a report command setting portion for setting a report command including a destination address having the identification information and the state information; and a transmitting portion for transmitting the report command to the collecting communication unit based on the destination address in the report command set by the report command setting portion.

8. A state information managing system of claim 7, wherein the collecting communication unit further comprises a receiving portion for receiving state information including the report command when identification information included in the report command transmitted from the transmitting portion of each of the respective report communication units coincides with identification information which has been set by the first identification information setting portion.

9. A state information managing system of claim 7, wherein the identification information is a state receiving address, and the first identification information setting portion can set a particular state receiving address as the identification information and also the second identification information setting portion can set a state receiving address identical to own address as the identification information.

10. A state information managing system of claim 8, wherein the identification information is a state receiving address, and the first identification information setting portion can set a particular state receiving address as the identification information and also the second identification information setting portion can set a state receiving address identical to own address as the identification information.

11. A state information managing system of claim 7, wherein the identification information is an identifier, and the first identification information setting portion can set an identifier of "1" or "0" as the identification information and also the second identification information setting portion can set the identifier of "0" or "1" as the identification information.

12. A state information managing system of claim 8, wherein the identification information is an identifier, and the first identification information setting portion can set an identifier of "1" or "1" as the identification information and also the second identification information setting portion can set the identifier of "0" or "1" as the identification information.

* * * * *

UNITED STATES PATENT AND TRADEMARK OFFICE
CERTIFICATE OF CORRECTION

PATENT NO.     : 6,205,123 B1
DATED          : March 20, 2001
INVENTOR(S)    : Yoshinori Nakatsugawa It is certified that error appears in the above-identified patent and that said Letters Patent is hereby corrected as shown below:

Column 6,
Line 41, change "receives," to -- receives --;'

Column 10,
Line 50, change "1" to -- "0"-- second occurrence.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*